(12) United States Patent
Rabinowitz

(10) Patent No.: US 7,804,637 B2
(45) Date of Patent: Sep. 28, 2010

(54) STABLE INDUCED ALIGNMENT OF MINI MIRRORS FOR SOLAR ENERGY CONCENTRATION AND OTHER OPTICAL FUNCTIONS

(76) Inventor: Mario Rabinowitz, 715 Lakemead Way, Redwood City, CA (US) 94062

( * ) Notice: Subject to any disclaimer, the term of this patent is extended or adjusted under 35 U.S.C. 154(b) by 984 days.

(21) Appl. No.: 11/561,388

(22) Filed: Nov. 18, 2006

(65) Prior Publication Data

US 2008/0137169 A1    Jun. 12, 2008

(51) Int. Cl.
G02B 26/00    (2006.01)
(52) U.S. Cl. .......................... 359/296; 359/871; 359/872
(58) Field of Classification Search ................ 359/871, 359/872, 873, 851, 853, 296, 290, 220, 221, 359/223, 224, 225, 226; 244/172.8; 136/246, 136/259, 244; 156/70, 145, 154
See application file for complete search history.

(56) References Cited

U.S. PATENT DOCUMENTS

| 3,670,323 | A | 6/1972 | Sobel et al. |
| 4,298,448 | A | 11/1981 | Muller et al. |
| 5,754,332 | A | 5/1998 | Crowley |
| 5,808,783 | A | 9/1998 | Crowley |
| 5,815,306 | A | 9/1998 | Sheridon et al. |
| 5,914,805 | A | 6/1999 | Crowley |
| 5,930,026 | A | 7/1999 | Jacobson et al. |
| 5,982,346 | A | 11/1999 | Sheridon et al. |
| 6,120,588 | A | 9/2000 | Jacobson |
| 6,197,228 | B1 | 3/2001 | Sheridon |
| 6,211,998 | B1 | 4/2001 | Sheridon |
| 6,222,513 | B1 | 4/2001 | Howard et al. |
| 6,243,058 | B1 | 6/2001 | Mikkelsen et al. |
| 6,262,707 | B1 | 7/2001 | Sheridon |
| 6,294,401 | B1 | 9/2001 | Jacobson et al. |
| 6,323,989 | B1 | 11/2001 | Jacobson et al. |
| 6,335,818 | B1 | 1/2002 | Torres |
| 6,570,700 | B2 | 5/2003 | Engler et al. |
| 6,612,705 | B1 | 9/2003 | Davidson et al. |
| 6,664,027 | B2 | 12/2003 | Griffith et al. |
| 6,680,725 | B1 | 1/2004 | Jacobson |
| 6,698,693 | B2 | 3/2004 | Davidson et al. |
| 6,738,176 | B2 | 5/2004 | Rabinowitz et al. |
| 6,843,573 | B2 | 1/2005 | Rabinowitz et al. |

(Continued)

FOREIGN PATENT DOCUMENTS

WO    PCT/US02/20199    6/2002

*Primary Examiner*—Ricky L Mack
*Assistant Examiner*—Tuyen Q Tra

(57) ABSTRACT

It is becoming increasingly imperative to harness solar energy due to the ever growing shortage of conventional energy sources. The instant invention is concerned with method and apparatus for the stable alignment of mirrors inside transparent micro balls with the plane of the mirror perpendicular to the aligning electric field for solar energy concentration and related applications such as optical switches, etc. Coupling of an applied perpendicular electric field with the induced dipole in a mirrored ball results in an unstable orientation. The instant invention circumvents this problem so that a stable orientation is accomplished, resulting in an increase in the percentage of incident light that is reflected to the receiver. Broadly, this invention deals with novel concepts used for alignment in the focusing of light wherever mirrors are used for focusing such as for solar propulsion assist, illumination and projection of light, optical switching, etc. A particularly important objective is the focusing of sunlight for solar power conversion and production.

20 Claims, 2 Drawing Sheets

U.S. PATENT DOCUMENTS

| | | |
|---|---|---|
| 6,957,894 B2 | 10/2005 | Rabinowitz et al. |
| 6,964,486 B2 | 11/2005 | Rabinowitz |
| 6,975,445 B1 | 12/2005 | Rabinowitz |
| 6,987,604 B2 | 1/2006 | Rabinowitz et al. |
| 6,988,809 B2 | 1/2006 | Rabinowitz |
| 7,077,361 B1 | 7/2006 | Rabinowitz |
| 7,112,253 B2 | 9/2006 | Rabinowitz |
| 7,115,881 B2 | 10/2006 | Rabinowitz |
| 7,130,102 B2 | 10/2006 | Rabinowitz |
| 7,130,107 B2 | 10/2006 | Liu et al. |
| 7,133,183 B2 | 11/2006 | Rabinowitz |
| 2002/0131151 A1 | 9/2002 | Engler et al. |
| 2005/0034750 A1 | 2/2005 | Rabinowitz |
| 2006/0150968 A1 | 7/2006 | Rabinowitz |

STABLE INDUCED ALIGNMENT OF MINI MIRRORS FOR SOLAR ENERGY CONCENTRATION AND OTHER OPTICAL FUNCTIONS

BACKGROUND OF THE INVENTION

1. Field of the Invention

It is becoming increasingly imperative to harness solar energy due to the ever growing shortage of conventional energy sources. The instant invention is concerned with method and apparatus for the stable alignment of mirrors inside transparent balls with the plane of the mirror perpendicular to the aligning electric field for solar energy concentration and related applications such as optical switches, etc. Coupling of an applied perpendicular electric field with the induced dipole in a mirrored ball (element) results in an unstable orientation. The instant invention circumvents this problem so that a stable orientation is accomplished, resulting in an increase in the percentage of incident light that is reflected to the receiver. Broadly, this invention deals with novel concepts used for alignment in the focusing of light wherever mirrors are used for focusing such as for solar propulsion assist, illumination and projection of light, optical switching, etc. A particularly important objective is the focusing of sunlight for solar power conversion and production by mirrored elements (balls).

2. Incorporation by Reference

In a solar energy application (as well as other functions), these elements in the form of transparent reflecting balls and other shapes are a critical feature of a unique solar concentrator which directs sunlight to a receiver as described in the following patents and copending patent applications related to this case. The following U.S. patents, allowed patent applications, pending patent applications, and Solar Journal publication are fully incorporated herein by reference.

1. U.S. Pat. No. 7,133,183 by Mario Rabinowitz, "Micro-Optics Solar Energy Concentrator" issued on Nov. 7, 2006.
2. U.S. Pat. No. 7,130,102 by Mario Rabinowitz, "Dynamic Reflection, Illumination, and Projection" issued on Oct. 31, 2006.
3. U.S. Pat. No. 7,115,881 by Mario Rabinowitz and Mark Davidson, "Positioning and Motion Control by Electrons, Ions, and Neutrals in Electric Fields" issued on Oct. 3, 2006.
4. U.S. Pat. No. 7,112,253, by Mario Rabinowitz, "Manufacturing Transparent Mirrored Mini-Balls for Solar Energy Concentration and Analogous Applications" issued on Sep. 26, 2006.
5. U.S. Pat. No. 7,077,361, by Mario Rabinowitz, "Micro-Optics Concentrator for Solar Power Satellites" issued on Jul. 18, 2006.
6. U.S. Pat. No. 6,988,809 by Mario Rabinowitz, "Advanced Micro-Optics Solar Energy Collection System" issued on Jan. 24, 2006.
7. U.S. Pat. No. 6,987,604 by Mario Rabinowitz and David Overhauser, "Manufacture of and Apparatus for Nearly Frictionless Operation of a Rotatable Array of Micro-Mirrors in a Solar Concentrator Sheet" issued on Jan. 17, 2006.
8. U.S. Pat. No. 6,975,445 by Mario Rabinowitz, "Dynamic Optical Switching Ensemble" issued on Dec. 13, 2005.
9. U.S. Pat. No. 6,964,486 by Mario Rabinowitz, "Alignment of Solar Concentrator Micro-Mirrors" issued on Nov. 15, 2005.
10. U.S. Pat. No. 6,957,894 by Mario Rabinowitz and Felipe Garcia, "Group Alignment Of Solar Concentrator Micro-Mirrors" issued on Oct. 25, 2005.
11. U.S. Pat. No. 6,843,73 by Mario Rabinowitz and Mark Davidson, "Mini-Optics Solar Energy Concentrator" issued on Jan. 18, 2005.
12. U.S. Pat. No. 6,738,176 by Mario Rabinowitz and Mark Davidson, "Dynamic Multi-Wavelength Switching Ensemble" issued on May 18, 2004.
13. U.S. Pat. No. 6,698,693 by Mark Davidson and Mario Rabinowitz, "Solar Propulsion Assist" issued on Mar. 2, 2004.
14. U.S. Pat. No. 6,612,705 by Mark Davidson and Mario Rabinowitz, "Mini-Optics Solar Energy Concentrator" issued on Sep. 2, 2003.
15. Solar Energy Journal, Vol. 77, Issue #1, 3-13 (2004) "Electronic film with embedded micro-mirrors for solar energy concentrator systems" by Mario Rabinowitz and Mark Davidson.
16. U.S. Publication 2005-003750-A1 by Mario Rabinowitz, "Spinning Concentrator Enhanced Solar Energy Alternating Current Producton" is Pending.
17. U.S. Publication 2006-0150968-A1 by Mario Rabinowitz, "Induced Dipole Alignment of Solar Concentrator Balls" is Pending.

3. Description of the Prior Art

Gyricon displays utilize the zeta potential to produce a dipole field. The "zeta potential," is the net surface and volume charge that lies within the shear slipping surface resulting from the motion of a body through a liquid. The zeta potential is an electrical potential that exists across the interface of all solids and liquids. It is also known as the electrokinetic potential. The zeta potential produces an electric dipole field when a sphere is made from two dielectrically different hemispheres due to their interaction with the fluid surrounding it.

All the Gyricon patents are exclusively concerned with directly viewed Displays as is the 1998 Gyricon U.S. Pat. No. 5,717,515 of Sheridon, entitled "Canted Electric Fields for Addressing a Twisting Ball Display". There appears to be no mention of any other application than directly viewed Displays, either specifically or by general statement. In this Sheridon patent, no mention is made of a mirror in the gyricon balls, nor is there any mention of specular reflection as would be obtained from a mirror. On the contrary, means are discussed to increase diffuse reflection from the balls so the Gyricon display may easily be observed from all angles. Certainly there is no anticipation of a solar concentrator application, mirrored illumination and projection, solar propulsion assist, or any other mini-mirror application. They do not mention coupling means to the balls other than by means of the zeta potential dipole, or an electret dipole. Also they do not mention an induced polarization electric dipole in the balls. In their dielectric balls there is an inadvertent insignificant induced polarization electric dipole in the dielectric, but it is small compared with the induced polarization electric dipole of the instant invention.

The 1981 Goodrich U.S. Pat. No. 4,261,653, is also a Display patent, and differs considerably from the instant invention. The instant invention differs substantially from that of Sheridon and from that of Goodrich in the use of: mirrored balls and cylinders; induced polarization electric dipoles in the mirrors with or without auxiliary electret permanent dipoles.

The U.S. Pat. No. 6,964,486 by Mario Rabinowitz, "Alignment of Solar Concentrator Micro-Mirrors" issued on Nov. 15, 2005 differs from the instant invention in that the induced dipole moment in the mirror is parallel to the mirror, and in the absence of structure present in the instant invention. The U.S. Publication 2006-0150968-A1 by Mario Rabinowitz, "Induced Dipole Alignment of Solar Concentrator Balls" is concerned with the induced dipole moment in the dielectric of the balls.

Definitions

"Collector" or "Receiver" as used herein denotes any device for the conversion of solar energy into other forms such as electricity, heat, pressure, concentrated light, etc.

"Concentrator" as used herein in general is a mirror system for focussing and reflecting light. In a solar energy context, it is that part of a solar Collector system that directs and concentrates solar radiation onto a solar receiver or other device. As used herein, concentrator refers to an ensemble of focussing planar mirrors which acts as a thin almost planar mirror constructed with stepped varying angles so as to have the optical properties of a much thicker concave mirror. Heuristically, it can somewhat be thought of as the projection of thin variable-angular segments of small portions of a thick mirror upon a planar surface. It is a focusing planar reflecting surface much like a planar Fresnel lens is a focusing transmitting surface. The tracking-focussing property of an ensemble of tiny elements like balls which make up the focussing planar mirror is an essential manufacturing goal of the instant invention.

"Dielectric" refers to an insulating material in which an electric field can be sustained with a minimum power dissipation. As used herein, "dielectric" will be a convenient way of referring to either plastic or glass.

"Elastomer" is a material such as synthetic rubber or plastic, which at ordinary temperatures can be stretched substantially under low stress, and upon immediate release of the stress, will return with force to approximately its original length. Silicone elastomers have exceptional ability to withstand ultraviolet light degradation.

"Element" is a rotatable mirrored component of a concentrator, such as a ball, prolate ellipsoid, oblate ellipsoid, cylinder, disk, semi-sphere, etc.

"Electret" refers to a solid dielectric possessing persistent electric polarization, by virtue of a long time constant for decay of charge separation.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"Lexan" is General Electric's trade name for a group of polyesters formed from carbonic acid, and generally called polycarbonate (PC). Polycarbonate has excellent mechanical properties while at the same time it has an ease for molding and extrusion. Lexan has good dimensional stability, good resistance to creep, and a high distortion temperature.

"Lucite" is DuPont's trade name for its transparent acrylic plastic and resins with no definite melting point.

"Mirror" as used herein refers to a highly reflective smooth surface (smooth on a size scale small compared to the wavelength of incident light). The smoothness achieves specular reflection.

"Plastic" is a polymeric material (usually organic) which can be shaped by flow. The resin is the homogeneous starting material, whereas the "plastic" refers to the final product also containing fillers, plasticizers, stabilizers, etc.

"Plexiglass" is a transparent plastic made from methyl methacrylate, similar to Lucite. Both can readily be made in sheet form.

"Silicone" as used herein refers to a heat-stable, rubber-like elastomer that is a water repellent, semiorganic polymer of organic radicals attached to silicon containing molecules, such as dimethyl silicone. Silicone elastomers are an excellent material within which to embed the mirrored balls or cylinders, because of their durability with respect to ultraviolet light, among other reasons.

"Specular reflection" occurs when the angle of reflection is equal to the angle of incidence of a light ray relative to a line perpendicular to the macroscopic reflecting surface, and lie in the same plane with it. Thus the reflected light ray travels in a definite predictable direction.

"Slab" as used herein refers to a plate, rod, bar, etc.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Zeta potential," is the net surface and volume charge that lies within the shear slipping surface resulting from the motion of a body through a liquid. It is an electrical potential that exists across the interface of all solids and liquids. It is also known as the electrokinetic potential. The zeta potential produces an electric dipole moment (field) of a spherical body when it is made from two dielectrically different hemispheres due to the interaction of the sphere with the fluid that it is immersed in.

For many purposes, it is desirable to induce a dipole perpendicular to the mirror surface. As will be explained in detail, this presents a dilemma as the induced dipole and the orientation (alignment) of the mirror perpendicular to the applied electric field is unstable. The instant invention addresses ways to circumvent this instability.

BACKGROUND OF THE INVENTION

This invention provides a low cost means for achieving affordable solar energy by greatly reducing the cost of solar concentrators which increase (concentrate) the density of solar energy incident on the solar energy converter. A limiting factor in the utilization of solar energy is the high cost of energy converters such as photovoltaic cells. For example, for the purpose of generating electricity, an expensive large area of solar cells may be replaced by a small area of high-grade photovoltaic solar cells operating in conjunction with inexpensive intelligent optics of this invention. The presence of rotatable mirrors in a solar concentrator presents an opportunity with respect to the basic nature of the alignment implementation. Mirrors are normally made of a conductive metallic coating. In an applied electrostatic field, E, a dipole moment is induced in the metallic conducting material of the mirrors because the charge distributes itself so as to produce a field free region inside the conductor. To internally cancel the applied field E, free electrons move to the end of each conducting mirror antiparallel to the direction of E, leaving positive charge at the end that is parallel to the direction of E. Another way to think of this in equilibrium is that a good conductor cannot long support a voltage difference across it without a current source. An induced electrostatic dipole in a pivoted conductor in an electrostatic field is somewhat analogous to an induced magnetic dipole in a pivoted ferromagnetic material in a magnetic field, which effect most people have experienced. When pivoted, a high aspect ratio (length to diameter ratio) ferromagnetic material rotates to align itself parallel to an external magnetic field.

The topic of the dipole interactions between balls seems not to have been discussed in the Gyricon patents and literature. A heuristic analysis shows that this is not a serious problem. The electric field strength of a dipole, $E_d$ is proportional to $1/r^3$, where r is the radial distance from the center of the dipole. The energy in the field is proportianal to $(E_d)^2$. Thus the energy of a dipole field varies as $1/r^6$. The force is proportional to the gradient of the field, and hence varies as $1/r^7$. With such a rapid fall off of the dipole interaction force, it can generally be made very small compared to the force due to the applied field E, and to the frictional forces that are normally present. Therefore interaction of the dipole field forces between mirrored elements (balls or cylinders) can generally be made negligible.

SUMMARY OF THE INVENTION

There are many objects, aspects, and applications of this invention. Broadly this invention deals with the general concept of method and apparatus for focusing light by using mirrors.

A particularly important object is the stable alignment of mirrors perpendicular to an applied aligning electric field for the focusing of sunlight in power conversion and production.

Another aspect is to provide a rugged system for conversion of solar energy to heat.

Another aspect is to provide electricity for mobile and stationary communications systems.

Another aspect is to provide large-scale environmentally clean energy.

Other objects and advantages of the invention will be apparent in a description of specific embodiments thereof, given by way of example only, to enable one skilled in the art to readily practice the invention singly or in combination as described hereinafter with reference to the accompanying drawings. In the detailed drawings, like reference numerals indicate like components.

DETAILED DESCRIPTION OF THE PRESENTLY PREFERRED EMBODIMENTS

As is described in detail, the objective of the instant invention of the stable alignment of mirrors inside transparent mini balls with the plane of the mirror perpendicular to the aligning electric field may be accomplished by any of a number of ways separately or in combination, as taught herein.

Figure 1:
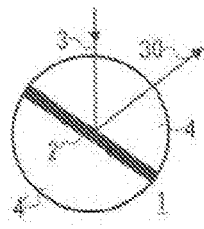
FIG. 1 is a cross-sectional view of a single spheroidal ball with a mid-plane mirror. This ball is one of a multitude of optical elements which can track a light source and focus a concentrated light beam onto a receiver.

FIG. 1 shows a rotatable element 1 of a focussing planar mini-mirror 2 with a mid-plane flat reflecting surface which specularly reflects incident light ray 3 so that the reflected light ray 30 is in the same plane and the angle of refection equals the angle of incidence. The element 1 shown here is a cross-sectional view of a single spheroidal ball of top transparent dielectric semi-sphere 4, and bottom material 4'. The ball element 1 is capable of two-axis tracking of the light source such as the sun, as are most of the different geometrical elements shown in FIGS. 1-11. The top semi-sphere 4 must be transparent, and the bottom semi-sphere 4' is preferably a transparent dielectric, but may be opaque and may even be metallic. This element 1 is one of a multitude of optical elements which can track a light source and focus a concentrated light beam onto a receiver as described in detail in references 1-17 above, especially reference 1.

Figure 2:
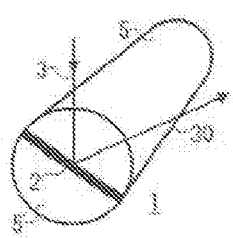
FIG. 2 is a cross-sectional view of a cylinder with an internal flat reflecting mirror. This cylinder is one of a multitude of optical elements which can track a light source and focus a concentrated light beam onto a receiver.

FIG. 2 shows a rotatable element 1 of a focussing planar mini-mirror 2 with an internal flat reflecting surface inside the element 1. The mirror 2 is in the plane between top hemicylinder 5 and bottom hemicylinder 5', and specularly reflects the incident light ray 3 with the reflected light ray 30. The element 1 shown is a perspective view of a cylinder which is capable of single-axis tracking of the light source such as the sun. The top semi-cylinder 5 must be transparent, and the bottom semi-cylinder is preferably transparent, but may be opaque and may even be metallic. This element 1 is one of a multitude of optical elements which can track a light source and focus a concentrated light beam onto a receiver.

Figure 3:
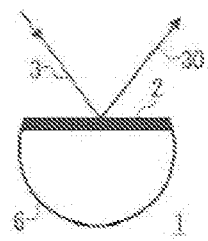
FIG. 3 is a cross-sectional view of a single semi-sphere with a mirror on its flat top. This mirrored semi-sphere is one of a multitude of optical elements which can track a light source and focus a concentrated light beam onto a receiver.

FIG. 3 is a cross-sectional view of a single rotatable element 1 which is a semi-sphere 6 with a flat top. Herein it is called a flat-top ball 6 with a mirror 2 which receives incident light 3 and returns reflected light 30. The flat on the top of the ball can be produced by any of standard techniques such as machining, shearing, die extrusion, etc.; or by photolithography process as will be subsequently discussed in conjunction with FIGS. 12-14. The technique or combination of techniques used, will depend on the degree of optical flatness required. The semi-sphere 6 is preferably transparent, but may be opaque, and may even be metallic. This element 1 is one of a multitude of optical elements which can track a light source and focus a concentrated light beam onto a receiver.

Figure 4:
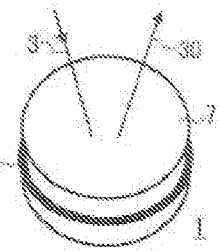
FIG. 4 is a perspective view of a circular disk with an internal flat reflecting mirror. This disk is one of a multitude of optical elements which can track a light source and focus a concentrated light beam onto a receiver.

FIG. 4 shows a perspective view of a rotatable element 1 of a focussing planar mi-mirror 2 with an internal flat reflecting surface inside the element 1. The element 1 is formed of two circular dielectric disks 7, between which is sandwiched mirror 2 that specularly reflects the incident light ray 3 with the reflected light ray 30. The top disk must be transparent, and the bottom disk is preferably transparent, but may be opaque, and may even be metallic. This element 1 is one of a multitude of optical elements which can track a light source and focus a concentrated light beam onto a receiver.

Figure 5:
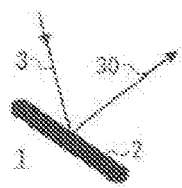
FIG. 5 is a is a cross-sectional view of a circular metal disk highly reflecting mirror. This metal disk is one of a multitude of optical elements which can track a light source and focus a concentrated light beam onto a receiver.

FIG. 5 shows a cross-sectional view of a rotatable element 1 which is a circular disk with rounded edges that serves as a metallic mini-mirror 2, which specularly reflects the incident light ray 3 with the reflected light ray 30. The element 1 is one of a multitude of optical elements which can track a light source and focus a concentrated light beam onto a receiver.

Figure 6:
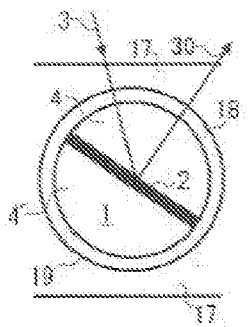
FIG. 6 is a cross-sectional view of a single spheroidal element (ball or cylinder) with a mid-plane mirror. This element is circumscribed in a lubricated spheroidal (or cylindroidal) bearing, and is one of a multitude of optical elements which can track a light source and focus a concentrated light beam onto a receiver.

FIG. 6 is a cross-sectional view showing the element 1 of FIG. 1. This cross-section depicts either a rotatable ball or a rotatable cylinder, completely encompassed with a lubricating fluid 18 which is circumscribed inside a concentric bearing 19 of containment sheet 17. Thus the confined and lubricated element 1 can make a nearly frictionless rotation, with hardly any undesirable displacement. The focussing planar mini-mirror 2 is a mid-plane flat reflecting surface which specularly reflects incident light ray 3 with the reflected light ray 30. An ensemble of such elements can thus be aligned with the application of moderate power. It is preferable to utilize a liquid 18 whose index of refraction matches the clear hemisphere or clear hemicylinder, and it should have the same density as element 1 to minimize buoyant forces. The index of refraction of the containment sheet 17, the liquid 18, and the optically transmissive upper portion of elements 1 should all be approximately equal. The elements 1 should be roughly balanced to minimize gross gravitational orientation.

Figure 7:
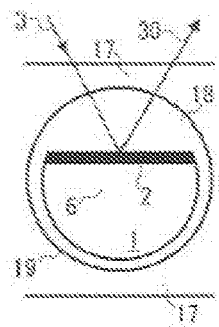
FIG. 7 is a cross-sectional view of a single semi-sphere with a mirror on its flat top. This element is circumscribed in a lubricated spheroidal bearing, and is one of a multitude of optical elements which can track a light source and focus a concentrated light beam onto a receiver.

FIG. 7 is a cross-sectional view of a single rotatable element 1 which is a semi-sphere 6 with a flat top mini-mirror 2 with rounded edges. The element 1 is completely encompassed with a lubricating fluid 18 which is circumscribed inside a concentric bearing 19 of the containment sheet 17. Also shown is the incident light ray 3 and the reflected light ray 30.

Figure 8:
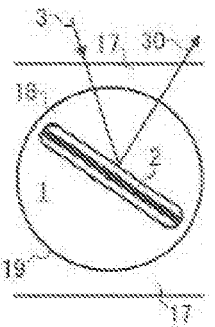
FIG. 8 is a cross-sectional view of a circular disk with an internal flat reflecting mirror. This element is circumscribed in a lubricated spheroidal bearing, and is one of a multitude of optical elements which can track a light source and focus a concentrated light beam onto a receiver.

FIG. 8 is a cross-sectional view of a rotatable element 1 of a focussing planar mini-mirror 2 between circular transparent dielectric top disk 7, and bottom disk 7' with rounded edges. The element 1 is completely encompassed with a lubricating fluid 18 which is circumscribed inside a concentric bearing 19 of containment sheet 17. Also shown is the incident light ray 3 and the reflected light ray 30.

Figure 9:
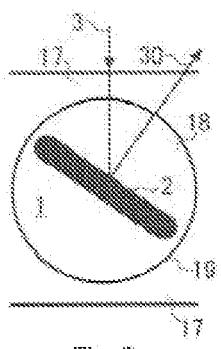
FIG. 9 is a cross-sectional view of a circular metal disk highly reflecting mirror. This element is circumscribed in a lubricated spheroidal bearing, and is one of a multitude of optical elements which can track a light source and focus a concentrated light beam onto a receiver.

FIG. 9 shows a cross-sectional view of a rotatable element 1 which is a circular disk metallic mini-mirror 2 with rounded edges, that is completely encompassed with a lubricating fluid 18 which is circumscribed inside a concentric bearing 19 of containment sheet 17. Also shown is the incident light ray 3 and the reflected light ray 30.

Figure 10:
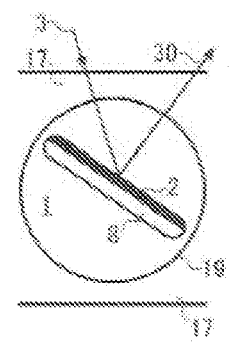
FIG. 10 is a cross-sectional view of a circular disk with a top surface flat reflecting mirror. This element is circumscribed in a lubricated spheroidal bearing, and is one of a multitude of optical elements which can track a light source and focus a concentrated light beam onto a receiver.

FIG. 10 shows a cross-sectional view of a rotatable element 1 which is a flat circular disk mini-mirror 2 on the top surface with backing 8, that is completely encompassed with a lubricating fluid 18 which is circumscribed inside a concentric bearing 19 of containment sheet 17. The backing 8 is present to give the mini-mirror 2 rigidity if the mirror is made of a highly reflective thin film of Chromium or Aluminum. The backing 8 may be metallic or dielectric. Also shown is the incident light ray 3 and the reflected light ray 30.

Figure 11:
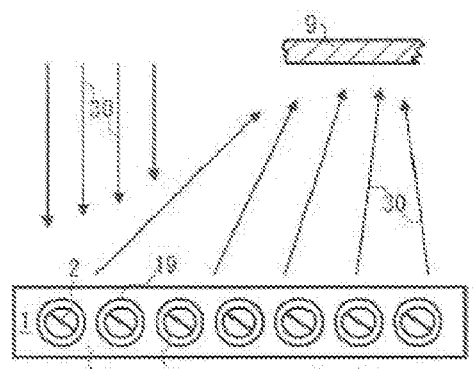
FIG. 11 is a cross-sectional view of an ensemble of rotatable mini-mirror elements circumscribed in lubricated bearing cavities within a containment sheet of a mini-optics concentrator. These mini-mirrors are rotatable so they can focus incident sunlight onto a receiver.

FIG. 11 is a cross-sectional view of concentrator system comprising an ensemble of elements 1 containing mini-mirrors 2 circumscribed in lubricant 18 inside spherical cavities 19 in a micro-optics concentrator. These mini-mirrors 2 are thus rotatable with minimal friction, so they can focus incident light 3 with concentrated reflected light 30 onto a receiver 9.

For example for a concentrator of elements 1 which are balls as shown, with a spherical bearing 19 diameter of 100 microns ($10^{-4}$ m=0.1 mm) a million balls would cover an area ~100 cm$^2$. A typical concentrator would have an enormous number of billions of balls, which track and focus a source of light such as the sun either singly or in groups of millions.

Figure 12:
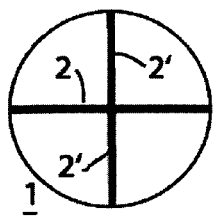
FIG. 12 is a cross-sectional view of a rotatable element illustrating two orthogonal mirrors.

FIG. 12 is a cross-sectional view of a rotatable element 1 with mirror 2 that is in the mid-plane (equatorial plane) of element 1, with mirror 2' perpendicular to mirror 1. In this case, the mirrors line up stably at an intermediate angle with respect to the applied electric field (e.g. at about a 45° angle). If only one of the mirrors were present such as is illustrated in FIG. 18, an alignment perpendicular to the applied electric field E would be unstable. The unstable configuration of FIG. 18 would cause the ball to rotate with the plane of the mirror parallel to the applied electric field E. FIGS. 13 through 17 and FIGS. 19 and 20 illustrate ways to achieve stable orientation of a mirror 2 at an approximately 90° angle with respect to an applied electric field E.

Figure 13:
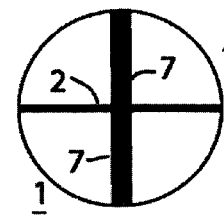
FIG. 13 is a cross-sectional view of a rotatable element with a mid-plane mirror and an orthogonal polar rod.

FIG. 13 is a cross-sectional view of a transparent rotatable element 1 with a mid-plane mirror 2 and an orthogonal conducting polar rod 7. The volume of conducting material in rod 7 is much greater than the volume of conducting material in the mirror. Therefore as discussed in conjunction with FIG. 18, the rod 7 will line up with the applied electric field E. Since the mirror 2 is perpendicular to the rod 7, the mirror 2 will line up at an approximately 90° angle with respect to an applied electric field E.

Figure 14:
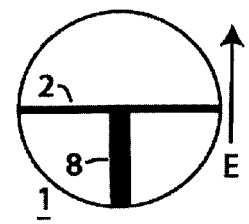
FIG. 14 is a cross-sectional view of a rotatable element with a mid-plane mirror and an orthogonal semi-rod.

FIG. 14 is a cross-sectional view of a rotatable element 1 with a mid-plane mirror 2 and an orthogonal conducting semi-rod 8. The element 1 is transparent in at least the portion above the mirror 2. The volume of conducting material in semi-rod 8 is much greater than the volume of conducting material in the mirror. Therefore as discussed in conjunction with FIG. 18, the semi-rod 7 will line up with the applied electric field E. Since the mirror 2 is perpendicular to the semi-rod 8, the mirror 2 line ups at about a 90° angle relative to the applied electric field E.

Figure 15:
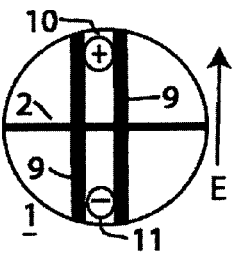
FIG. 15 is a cross-sectional view of a rotatable element with a mid-plane mirror and two parallel rods orthogonal to the mirror with an embedded electret between the two rods.

FIG. 15 is a cross-sectional view of a rotatable element 1 with a mid-plane mirror 2 and two parallel rods 9 orthogonal to the mirror 2 with an embedded electret between the two rods 9. The electret has positive charge 10 at one pole and negative charge 11 at the other pole of the ball. The electret is included to strengthen the dipole interaction and permit a reduction of the volume of material in the rods 9. The net dipole of the electret and induced dipoles in the rods 9 interacts with the applied electric field E to align the mirror 2 at approximately right angles to E. The element 1 is transparent in most of the portion above the mirror 2.

Figure 16:
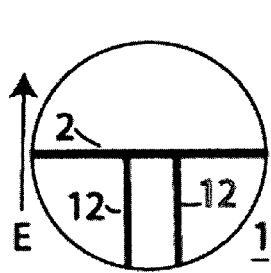
FIG. 16 is a cross-sectional view of a rotatable element with a mid-plane mirror and two parallel semi-rods or semi-plates orthogonal to the mirror.

FIG. 16 is a cross-sectional view of a rotatable element 1 with a mid-plane mirror 2 and two parallel conducting semi-rods 12 (or conducting semi-plates 12) orthogonal to the mid-plane mirror 2. Since the volume of material in conducting semi-rods or semi-plates 12 greatly exceeds the volume of the mirror 2, the mirror lines up perpendicular to the applied electric field E.

Figure 17:
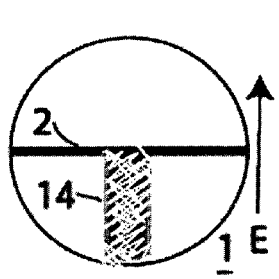
FIG. 17 is a cross-sectional view of a rotatable element with a mid-plane mirror and an orthogonal dielectric slab of high dielectric constant orthogonal to the mirror.
Figure 18:
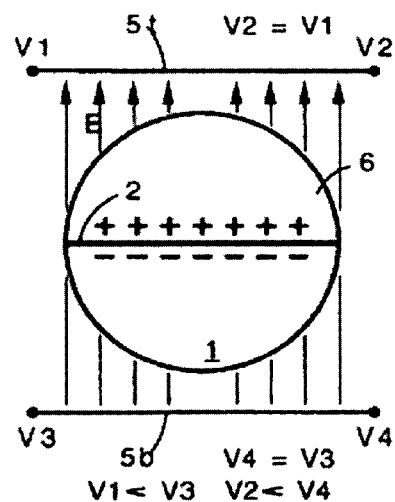
FIG. 18 is a cross-sectional view showing a rotatable element in an unstable position with an induced dipole in the mid-plane mirror perpendicular to the plane of the mirror. As shown the plane of the mirror is perpendicular to the applied electric field. From this unstable position it will rotate to an alignment in which the plane of the mirror aligns in the direction of the applied electric field.

FIG. 17 is a cross-sectional view of a rotatable element 1 with a mid-plane mirror 2 and an orthogonal dielectric slab 14 (rod or plate) of high dielectric constant orthogonal to the mirror 2. As discussed in conjunction with FIG. 18, the dielectric slab 14 will line up with the applied electric field E. Since the mirror 2 is perpendicular to the slab 14, the mirror 2 will line up at an approximately 90° angle with respect to an applied electric field E.

FIG. 18 is a cross-sectional view showing a rotatable element 1 in an unstable position with an induced dipole shown with + and − signs on the mid-plane mirror 2 perpendicular to the plane of the mirror 2. As shown the plane of the mirror is perpendicular to the applied electric field E. From this unstable position it will rotate to an alignment in which the plane of the mirror aligns in the direction of the applied electric field E. Also shown are the top electrode 5t with voltages V1 and V2, which together with the bottom electrode 5b voltages V3 and V4 produces the vertically shown electric field E.

The torque on a body in an electric field is the cross product of the net vector dipole moment of the body and the electric field vector. Thus it is proportional to the sine of the angle between the net dipole vector and the electric field vector. As such it is a maximum when these two vectors are orthogonal. A rough and ready approximate equation for the maxiumum torque on such a mid-plane mirrored ball is $$\tau \sim \varepsilon V^2 \left[ \frac{\pi}{4} d + (K-1)\left(\frac{\pi}{3}r - \frac{\pi}{4}d\right) \right],$$

where $\tau$ is the torque in Newton-meters, V is the applied grid voltage, r is the ball radius in meters, d is the mirror thickness in meters (d<2r), and K is the dielectric constant of the ball. For example 2<K<3 for Lucite, and K~1 for glass. K≈$n^2$, where n is the index of refraction of a transparent dielectric.

In the instant invention, both the dielectrics and the conductors contribute to the total torque. In the context of the instant invention K>>4 may be considered high for a dielectric slab whose volume>>0.2 the ball volume. Either the conductor or the dielectric can dominate depending on relative volumes and the magnitude of the dielectric constant K. For a conducting slab the ratio of slab volume to mirror volume>>10 is adequate. The larger the numbers given in this paragraph, the more closely will the mirror rotate to a substantially orthogonal angle with respect to the applied electric field.

Figure 19:
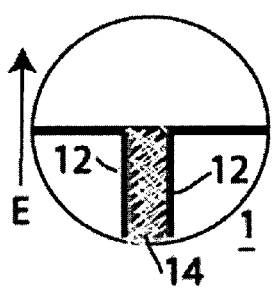
FIG. 19 is a cross-sectional view of a rotatable element with a mid-plane mirror and an orthogonal dielectric slab of high dielectric constant between two parallel semi-rods or semi-plates orthogonal to the mirror.

FIG. 19 is a cross-sectional view of a rotatable element 1 with a mid-plane mirror 2 and an orthogonal dielectric slab 14 of high dielectric constant between two conducting parallel semi-rods or semi-plates 12 orthogonal to the mirror. As explained in conjunction with FIG. 18, the dielectric slab 14 and conductors 12 will line up with the applied electric field E. Since the mirror 2 is perpendicular to the slab 14 and conductors 12, the mirror 2 will line up at an approximately 90° angle with respect to an applied electric field E.

Figure 20:
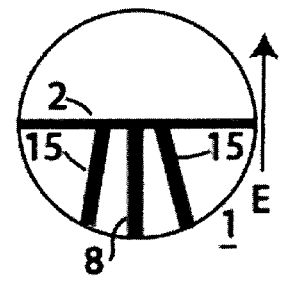
FIG. 20 is a cross-sectional view of a rotatable element with a mid-plane mirror and three semi-rods or semi-plates roughly orthogonal to the mirror.

FIG. 20 is a cross-sectional view of a rotatable element 1 with a mid-plane mirror 2 and an orthogonal conductor 8. The two conducting semi-rods or semi-plates 15 are roughly orthogonal to the mirror 2 with equal and opposite inclination so that in vector representation, their horizontal vectors cancel, and their vertical vector is pependicular to the mirror 2. If the conductors 8 and 15 have a much higher volume than that of the mirror, the mirror will orient itself perpendicular to the applied electric field E.

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents.

The invention claimed is:

1. A mini-optics solar concentrator comprising:
   a) an array of rotatable dielectric elements;
   b) a mini-mirror embedded in each of said elements;
   c) said elements being transparent on at least one side of said mirrors;
   d) at least one slab embedded in said dielectric elements;
   e) said slab oriented approximately perpendicular to each mirror;
   f) a voltage power supply for applying an external electric field for coupling to said slab;
   g) said electric field producing an induced electric dipole in said slab; and
   h) said elements rotating due to the torque interaction of said electric field and said induced dipole.

2. An apparatus of claim 1 wherein said slab is a conductor.

3. An apparatus of claim 1 wherein said slab is a dielectric of higher dielectric constant than said dielectric element.

4. An apparatus of claim 1 wherein said slab is only in one hemi-element.

5. An apparatus of claim 1 wherein two such slabs are combined with an electret in said element.

6. An apparatus of claim 1 wherein a conducting slab is combined with a dielectric slab of higher dielectric constant than said dielectric element.

7. A method for rotating elements for directed reflection of light, comprising the steps of a) embedding a mini-mirror in each of said elements;
b) forming said elements of transparent material on at least one side of said mirrors;
c) embedding at least one slab in said elements;
e) orienting said slab approximately perpendicular to each of said mini-mirrors;
f) applying an external electric field to said to said slab;
g) inducing an electric dipole in said slab; and
h) rotating said elements due to the torque interaction of said electric field and said induced dipole.

8. The method of claim 7 wherein said slab is a conductor.

9. The method of claim 7 wherein said slab is a dielectric of higher dielectric constant than said dielectric element.

10. The method of claim 7 wherein said slab is only in one hemi-element.

11. The method of claim 7 wherein two such slabs are combined with an electret in said element.

12. The method of claim 7 wherein a conducting slab is combined with a dielectric slab of higher dielectric constant than said dielectric element.

13. A focusing and directing concentrator of reflected light comprising:
  a) at least one rotatable dielectric element;
  b) a mini-mirror embedded said element;
  c) said element being transparent on at least one side of said mirror;
  d) at least one slab embedded in said dielectric element;
  e) said slab oriented approximately perpendicular to said mirror;
  f) a voltage power supply for applying an external electric field for coupling to said slab;
  g) said electric field producing an induced electric dipole in said slab; and
  h) said elements rotating primarily in response to the torque interaction of said electric field and said induced dipole.

14. An apparatus of claim 13 wherein said slab is a conductor.

15. An apparatus of claim 13 wherein said slab is a dialectric of higher dialectric constant than said dialectric element.

16. An apparatus of claim 13 wherein said slab is only in one hemi-element.

17. An apparatus of claim 13 wherein two such slabs are combined with an electret in said element.

18. An apparatus of claim 13 wherein a conducting slab is combined with a dielectric slab of higher dielectric constant than said dielectric element.

19. An apparatus of claim 13 wherein at least two slabs are inclined with approximately equal and opposite angles with respect to said mirror.

20. An apparatus of claim 13 wherein said slab is a second mirror.

* * * * *